United States Patent [19]

Schneider

[11] Patent Number: 5,487,594
[45] Date of Patent: Jan. 30, 1996

[54] METHOD FOR UPDATING A WHEEL REFERENCE VALUE BY ASSESSING PROXIMITY FOR THE BRAKING POWER CURVE PEAK

[75] Inventor: Michael J. Schneider, Bloomfield Township, Mich.

[73] Assignee: AlliedSignal Inc., Morristown, N.J.

[21] Appl. No.: 346,726

[22] Filed: Nov. 30, 1994

[51] Int. Cl.$^6$ .................................................. B60T 8/00
[52] U.S. Cl. ................................................... 303/155
[58] Field of Search .......................... 303/93, 100, 103, 303/104, 110, 113.1, 116.1, 119.1, DIG. 1–4; 364/426.02

[56] References Cited

U.S. PATENT DOCUMENTS

| | | | |
|---|---|---|---|
| 4,715,662 | 12/1987 | van Zanten et al. | 303/100 X |
| 4,916,619 | 4/1990 | Walenty et al. | 303/100 X |
| 5,070,459 | 12/1991 | van Zanten et al. | 303/100 X |
| 5,141,294 | 8/1992 | van Zanten et al. | 303/100 X |
| 5,302,009 | 4/1994 | Menard | 303/93 X |
| 5,302,010 | 4/1994 | Ehmer et al. | 303/93 X |

*Primary Examiner*—Josie A. Ballato
*Attorney, Agent, or Firm*—Leo H. McCormick, Jr.; Larry J. Palguta

[57] ABSTRACT

A method and apparatus for controlling an anti-skid braking system that uses wheel speed and wheel cylinder pressure to maximize braking power during an antilock stop. The pressure is adjusted to hold the wheel to a wheel speed reference and that wheel speed reference is adjusted to maximize braking power. Braking power may be viewed as the product of wheel cylinder pressure and wheel velocity. An algorithm to maximize braking power is then employed to control the application of braking force to the wheel.

12 Claims, 4 Drawing Sheets

METHOD FOR UPDATING A WHEEL REFERENCE VALUE BY ASSESSING PROXIMITY FOR THE BRAKING POWER CURVE PEAK

BACKGROUND OF THE INVENTION

The present invention relates generally to vehicular braking systems and more particularly to vehicle braking systems having anti-skid or antilock features.

Many known anti-skid devices simulate a driver induced anti-skid technique by cyclically increasing and decreasing the braking force exerted on the wheels so that a slipping wheel having a tendency to lock is permitted to re-accelerate back to a speed corresponding to the speed of the vehicle. This is typically achieved by control valves alternately allowing fluid to flow out of and then into the brake cylinder, thus lowering and then raising the brake pressure. With such a conventional antilock braking system, the controlled wheel occasionally begins slipping too much and operates for short times with comparatively large amounts of slip. This means a level of slip high enough to reduce lateral force available for steering and vehicle stability.

While such cycling may cause a momentary reduction in braking effectiveness as well as reduced stability and steerability, and other undesirable effects, it is useful in allowing re-setting of the calculated vehicle velocity. Many antilock braking systems are invoked when a calculated wheel speed differs sufficiently from a sensed wheel speed. In a typical system, wheel speeds are used to determine slip by comparison to a computed vehicle velocity either directly or indirectly. Without a constant re-checking of the computed vehicle velocity, errors will accumulate and cause serious degradation leading to substantially reduced braking and/or reduced lateral force.

It is desirable to provide an anti-skid braking system which acts as a continuous process with the corrective action taken being proportional to the deviation from a desired performance. Such a process is relatively easy to control using conventional methods such as Proportional-Integral-Differential (PID) controllers. With such a system, a differential correction is readily included allowing the system to anticipate future conditions by reacting to the rate of change of the error condition. Also, an integral term can reduce the steady state error.

One known system for producing maximum retarding force on a continuous basis without the accumulated error problem utilizes an accelerometer to generate a single speed reference for controlling an antilock system. This system is disclosed in copending U.S. Ser. No. 08/353,861, filed Dec. 12, 1994 (assignee docket no. 223-89-0020) and assigned to the present assignee. This system maximizes road friction. On gravel roads, maximum road friction is attained with the wheels locked. Locked wheels result in a loss of stability and steerability. This system generates a single wheel reference speed for all the wheels. Differences due to cornering or differing wheel diameters are not taken into account.

SUMMARY OF THE INVENTION

It would be desirable to retain the advantages of the system of the abovementioned copending application while eliminating its deficiencies along with the need for an accelerometer.

It would also be desirable to provide an antilock system which maintains maximum braking force near the peak of the braking power-slip curve at all times.

In general and in one form of the invention, a method of calculating a measure of vehicle braking power for the control of a vehicle wheel antilock braking system includes monitoring wheel velocity to detect a wheel skid and converting from a conventional braking mode to an anti-skid braking mode upon detection of a wheel skid. A measurement is made of the current vehicle wheel velocity and a corresponding current vehicle wheel braking torque is determined. The current wheel velocity and current wheel braking torque are then utilized to calculate vehicle braking power. The braking power is maximized and the braking torque of the wheel is controlled appropriately.

BRIEF DESCRIPTION OF THE DRAWING

Corresponding reference characters indicate corresponding parts throughout the several views of the drawing.

DESCRIPTION OF THE PREFERRED EMBODIMENT

Figure 1:
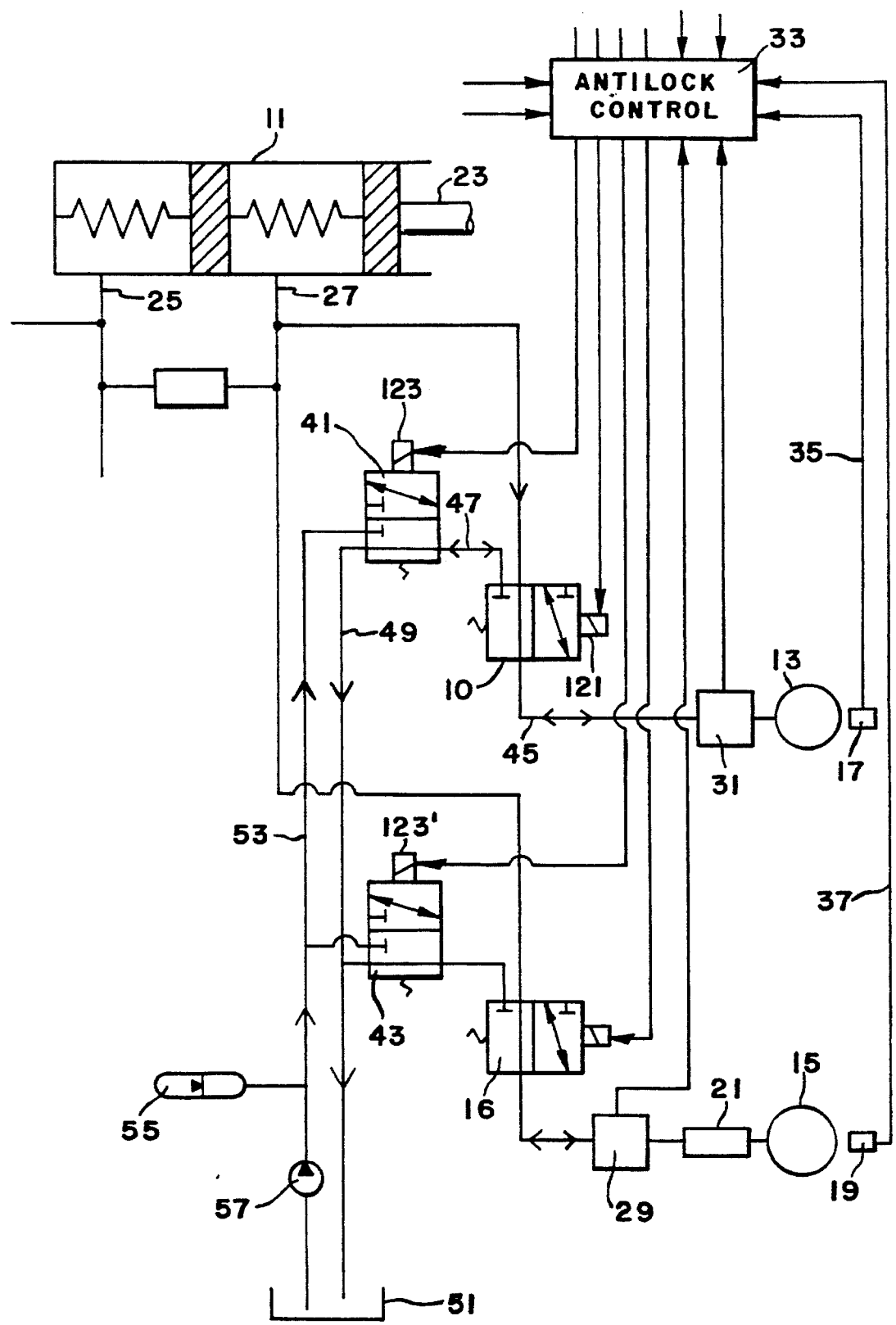
FIG. 1 is a schematic representation of a portion of an overall brake and anti-skid system illustrating the present invention in one form.

A portion of an antilock braking system for a passenger car or similar vehicle is shown schematically in FIG. 1. The system includes solenoid actuated anti-skid or isolation valves 10 and 16 which are located between an operator-controlled pressure source or master cylinder 11 and corresponding front wheel and rear wheel hydraulic brake actuators (wheel cylinders) 13 and 15, respectively. Typically, the pressure source 11 is a conventional master cylinder having, for example, two separate circuits, one for the left front vehicle wheel brake actuator 13 and right rear vehicle wheel brake actuator 15, and the other, which is substantially identical and not shown, for the right front/left rear vehicle wheel brakes. There are conventional proportioning valves such as 21 associated with the rear vehicle wheel brake 15 to reduce the likelihood of a rear wheel skid by applying only a portion of the line pressure to the rear wheel brake cylinders when the hydraulic pressure is above some predetermined threshold. Each of the vehicle wheels also have rotational speed sensors such as 17 for the front vehicle wheel brake and 19 for the rear vehicle wheel brake to providing electrical indications of the angular velocities of individual wheels to a electronic control unit 33.

When the driver wishes to slow the vehicle, linkage 23 transmits a force from the brake pedal to move pistons in master cylinder and pressurize fluid which is communicated from the master cylinder 11 by way of conduit (brake lines) 25 to the front 13 and rear 15 wheel hydraulic brake actuators and to a pair of hydraulically actuated wheel rotation braking devices associated with conduit 27. The individual wheel brake lines each have a pressure sensor such as 29 or 31 and individual solenoid actuated anti-skid valves such as 10 and 16. The individual wheel anti-skid or isolation valves such as 10 and 16 are normally in the position shown in FIG. 1 and transmit the fluid pressure to the wheel brakes to slow the vehicle during the normal braking mode. In the event that electronic control unit 33 detects a sufficient difference between one or more actual wheel speeds as indicated by a signal from a wheel speed sensor such as on line 35 or 37, and what those speeds should be based on operator commanded deceleration, to indicate a skid condition for a particular wheel, an actuating signal is sent to the appropriate ones of four solenoid actuated anti-skid valves such as 10 and 16 to shut off the hydraulic fluid path from the master cylinder 11 to the appropriate vehicle wheel brake actuator, and to establish instead a bleed path from such vehicle wheel brake actuator by way of conduits such as 45, 47 and 49 to a common low pressure reservoir such as the sump 51 thereby relieving the vehicle wheel brake actuator pressure allowing the slipping wheel to accelerate. At a time when wheel speed gets sufficiently close to the vehicle speed, the solenoid such as 121, is de-energized and the anti-skid valve 10 or 16 resumes its normal braking condition where the conduit 45, for example, is directly connected to pressure sensor 31. Periodically, during the time fluid is being bled from the brake actuator, a valve such as 41 or 43 is actuated to connect conduits 47 and 53 so that rebuild pressure is supplied from accumulator 55 through the series connected valves 41 and 10 or valves 43 and 16 to the appropriate individual wheel vehicle wheel brake actuator. The pressure in accumulator 55 is maintained by pump 57 and its associated driving motor. The operation of solenoids such as 123,123' of valves 41 and 43 may be of either the conventional or the enhanced anti-skid mode as disclosed in the abovementioned copending application. In the enhanced mode, solenoid valve 41 or 43 is operated at a constant frequency and the relative on-time is changed so that the average pressure at the brake port varies in concert with the duty factor or percentage of on-time. The selection of an appropriate duty factor to retain maximum braking force is determined by electronic control unit 33 as at 39 in FIG. 4.

Braking power is the rate that the kinetic energy of the vehicle is dissipated by the brakes. Braking power can be calculated as the product of the wheel angular speed and the brake torque. Brake torque is defined as brake pressure times the brake gain. In the case of a disc brake, the brake gain is cylinder area times the pad friction coefficient times 2 times the effective radius of the pads. Since brake torque varies in proportion to brake pressure, and brake pressure is controlled in ABS operation, brake pressure can be used to represent brake torque for the purpose of maximizing braking power. Other measures of braking effectiveness may also be maximized. For example, road friction may be maximized as in the aforementioned copending application or by searching for the wheel speed reference that requires the highest wheel cylinder pressure to hold the wheel at the reference speed. If the vehicle velocity is known, a normalized braking power may be used as the measure of braking effectiveness. Normalized braking power is the product of wheel speed and a measure of braking torque divided by vehicle velocity. The typical measure of braking torque is wheel cylinder pressure.

Figure 2:
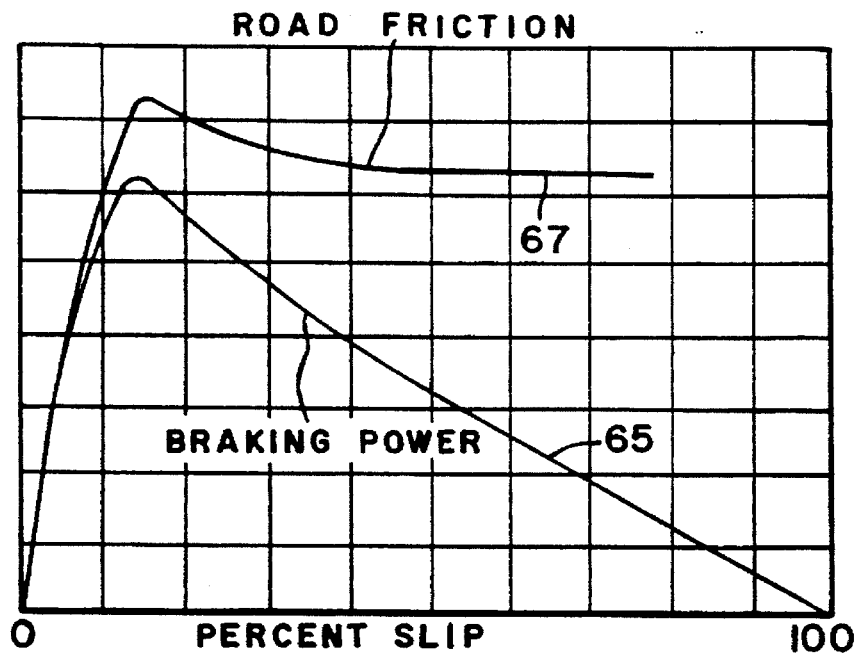
FIG. 2 is a graph comparing road friction and braking power as functions of wheel slip on a typical hard road surface.
Figure 3:
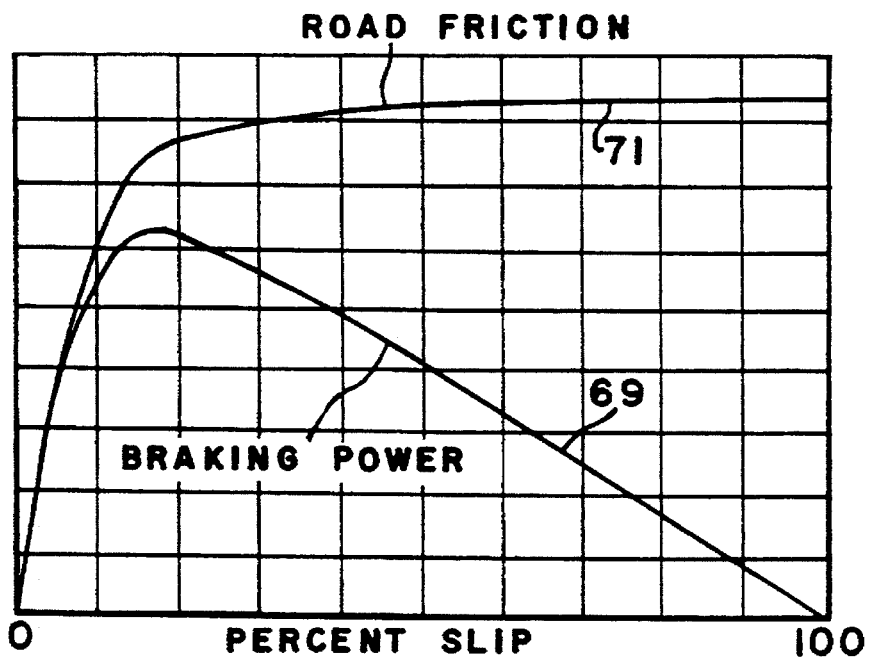
FIG. 3 is a graph comparing road friction and braking power as functions of wheel slip on a typical gravel road surface.

The relationship between braking power (defined as the product of wheel velocity and brake torque) and wheel slip for a wheel at equilibrium illustrated in FIG. 2 by curve 65 while curve 67 depicts conventional road friction as a function of wheel slip. Both curves 65 and 67 are for a conventional paved or hard road surface. Note that braking power 65 drops off more dramatically and that the peak of the curve is more readily identified as the percentage of slip increases. These same two parameters braking power 69 and conventional road friction 71 for a gravel road surface are illustrated in FIG. 3. Note with such a brake system on gravel surfaces, the friction continues to increase up to complete lock-up of the wheel. Such lock-up, of course, has the undesirable side effects of loss of lateral stability and steerability.

In the antilock braking mode, the control unit 33 provides a current wheel speed reference ($V_r$) estimate for each wheel by the recursive relationship:

$$V_r(k)=V_r(k-1)+V_n+optstep. \qquad (1)$$

Figure 5:
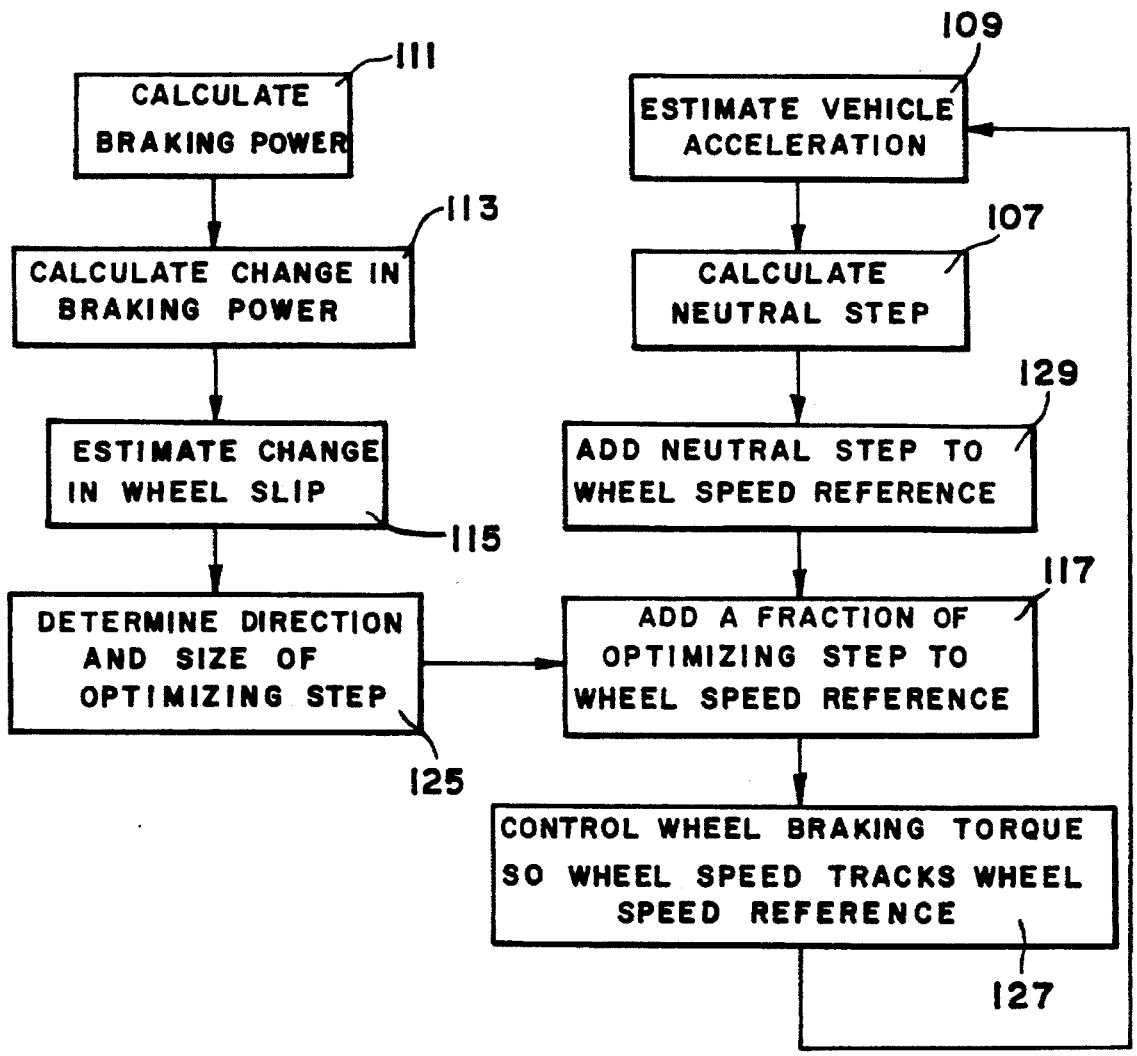
FIG. 5 is a simplified flow chart showing the wheel speed reference computation and utilization.

The neutral step ($V_n$) may be computed in FIG. 5 at 107 by the equation:

$$V_n = A*T*k \qquad (2)$$

where A is the vehicle acceleration, and T is the sample period of the closed loop wheel speed controller and the constant k is selected to be about (0.85) or some other similar value which is assumed or determined to represent the velocity ratio of the wheel and vehicle corresponding to the peak value of braking power. The acceleration (A) could be measured by an accelerometer, however, as a more economical alternative, it may be estimated from wheel cylinder pressure by summing the road friction over all the wheels and dividing by the estimated vehicle mass. The road friction at each wheel may be estimated by a time average of the wheel cylinder pressure. The pressure may be first passed through a low pass filter. Thus, acceleration at 109 is proportional to the sum of the individual wheel cylinder pressures.

Brake pressure is also provided as an input to the computation of braking power at 111 as illustrated in FIG. 5. Braking power is directly proportional to the product of wheel cylinder pressure and wheel velocity. The change in braking power is calculated at 113. Since braking power is proportional to wheel speed, it naturally gets lower as the vehicle slows. Therefore, two successive measurements at different points in time will almost always show a decrease. For the optimizing search to work, the comparison of braking power values at different points in time takes into account the decrease due to vehicle deceleration. This term compensates for the decrease in braking power that would occur during an optimizing step period due to the wheel maintaining a constant level of percent slip while the vehicle slows. The compensating term is calculated as the average pressure during the optimizing step period times the average vehicle deceleration times the period length times the speed ratio, the wheel speed divided by the vehicle speed. If the vehicle speed is unknown, a typical ratio of wheel speed to vehicle speed constant k such as 0.85 can be used. Similarly, the change in wheel slip is estimated at 115. If the signs at 113 and 115 are the same, wheel slip should be increased (wheel velocity decreased) for an increase in braking power. If the signs are different, the vehicle is operating beyond the peak in the braking power-slip curve and the optimizing step value should be positive. The optimizing step (optstep) at 125 may be zero, an increment added to the neutral step if the braking power/slip gradient is positive, or an increment subtracted from the (negative) neutral step if the braking power/slip gradient is negative. The optimizing step is typically calculated far less frequently than the neutral step. A fraction of optstep is added at 117 to the function illustrated in FIG. 5 to the neutral step and is used to increment the wheel speed reference on line 119. The braking system is then controlled as indicated at 127 so that the actual wheel speed closely follows the wheel speed reference. When optstep=0, only the neutral step is selected. Since vehicle acceleration is negative, the neutral step will be negative and is added to the previous value of the wheel speed reference.

The change in vehicle speed minus the change in wheel speed is used to estimate the change in wheel slip at 115. The change in vehicle speed is the product of acceleration from equation (2) and the period of the optimizing step.

The magnitude of the optimizing step is determined from:

$$optstep = \pm(c_1 * V - c_2 * V_n - c_3) \quad (3)$$

where V is a value roughly proportional to vehicle velocity such as an average of the four wheel speeds. In one preferred implementation, $c_1 = 0.02$, $c_2 = 3.0$, $c_3 = 0.2$ and the controller sample period was about 1/20 the optimizing step period.

Of course, the recursive relationship (1) assumes initialization; that is, some reference velocity and wheel slip velocity need to be determined independently of the relationship, or initial values assumed and the relationship allowed to settle into a steady state condition. For example, it is possible to establish vehicle velocity by measuring vehicle wheel speed, and then to utilize that established vehicle velocity as the initial previously computed vehicle reference velocity in the updating step. As another example, initial values of 90% or 95% of vehicle speed might be assumed to avoid under braking.

Figure 4:
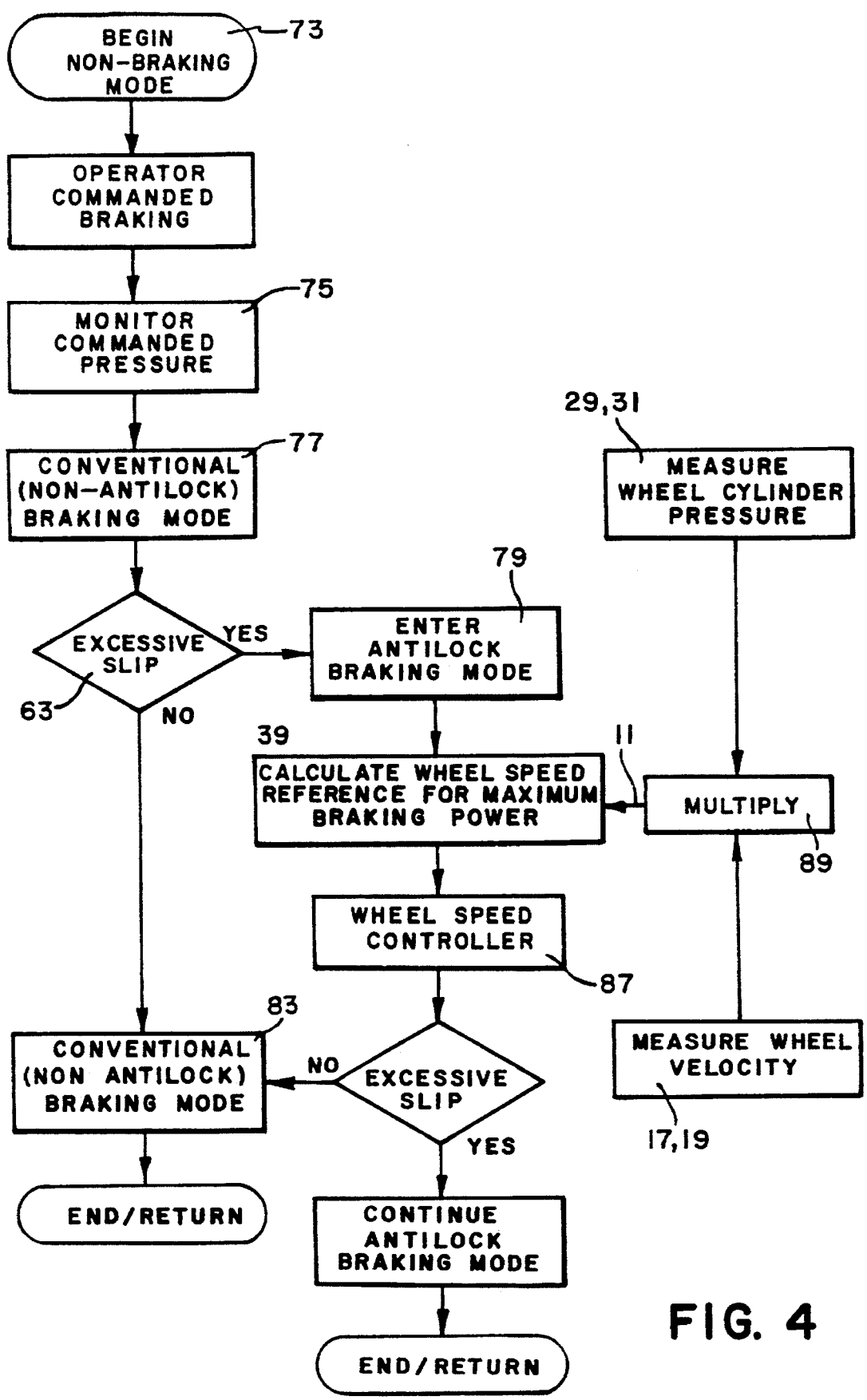
FIG. 4 is a flow chart illustrating the alternative modes of operation of the system of FIG. 1.

Overall operation of the system of FIG. 1 is shown in FIG. 4. From a non-braking condition 73, an operator depresses the brake pedal and an input is supplied through linkage 23 to actuate the master cylinder 11 and supply pressurized fluid to lines 25 and 27. The commanded pressure is monitored at 75 to insure that antilock braking pressure never exceeds the commanded value. Conventional braking 77 continues as long as it is commanded unless excessive slip is detected at 63. Initial detection of excessive slip causes the system to enter the anti-skid braking mode at 79 during which the valves such as 41 and 43 are controlled, as indicated generally at 87, to maintain braking pressure near the peak of the braking force curve 65 or 69. Of course, the reapply pressure should not exceed the operator commanded pressure 75. Should a skid no longer be indicated, as at 81, the system returns to normal operator commanded braking at 83. The system of FIG. 4 operates to maximize braking power, for example, the product at 89 of wheel cylinder pressure and wheel velocity as measured by the sensors 17 and 19, at 39.

While a two-channel system has been described. The system can be implemented in two, three or four-channel versions. A three-channel system seems best suited to front-wheel drive vehicles. Other techniques for maximizing braking power as well as other definitions of braking power are possible. For example, the so-called "Perret-Rouxel Automatic Hill Climbing Control" as described in the book CONTROL by Takahashi, Robins and Auslander forms a suitable alternative to the described maximization technique. Those skilled in the art will devise many other adaptations, modifications and uses for the present invention beyond those herein disclosed yet within the scope of the present invention as set forth in the claims which follow.

What is claimed is:

1. In the control of a vehicle anti-lock braking system of the type utilizing measured wheel velocity and computed wheel reference values to control braking torque, the method of searching for maximum braking power comprising the steps of:

determining (125) on which side of the peak of a braking power curve the vehicle is operating if the vehicle is not operating at the peak of the braking power curve;

incrementing (129, 117) a prior wheel reference value by an amount which changes the prior wheel reference value toward the peak of the braking power curve thereby calculating an updated wheel reference value (119); and utilizing (127) the updated wheel reference value to control appropriately the braking torque of a wheel.

2. The method of claim 1 wherein each wheel reference value is a measure of wheel slip.

3. The method of claim 2 wherein the step of determining comprises calculating (113, 115, 125) the sign of the slope of the braking power curve at the current wheel slip.

4. The method of claim 1 wherein each wheel reference value (119) is a measure of wheel velocity.

5. The method of claim 1 wherein the step of determining comprises calculating (113, 115, 125) the sign of the slope of the braking power curve at the current wheel slip, the amount by which a prior wheel reference value is incremented being a sum (117) of a predetermined value (107) and a positive optimizing value when the slope is negative and a difference between the predetermined value and the positive optimizing value when the slope is positive.

6. A method of calculating wheel speed references (119) for the control of a vehicle anti-lock braking system comprising the steps of:

repeatedly measuring (17, 19, 93) the speed of a wheel;

repeatedly estimating (115) the change in the wheel slip velocity utilizing the two most recent measured speeds of the wheel and an estimate of the change in vehicle speed;

determining (29, 31) a commanded braking pressure;

repeatedly calculating (103, 111) braking power values from a measured wheel speed and determined commanded braking pressure;

repeatedly computing changes in braking power utilizing the two most recent braking power values;

repeatedly computing (117) a wheel speed reference by determining the sign of a ratio of the most recent change in braking power to the most recent change in estimated wheel slip, and updating a previously computed wheel speed reference; and controlling (127) appropriately the braking torque of a wheel.

7. The method of claim 6 wherein the step of controlling includes adjusting the braking pressure to hold the wheel speed close to the wheel speed reference.

8. The method of claim 7 wherein the step of updating is performed gradually by increasing the previous reference at a rate equal to a first value plus a second value divided by the time between two consecutive computations of wheel speed reference in the event the sign of the determined ratio is positive, and increasing that previous reference at a rate equal to the first value minus the second value divided by the time between two consecutive computations of wheel speed reference in the event the sign of the determined ratio is negative.

9. The method of claim 7 wherein the step of updating is performed by incrementing the previous reference by a sum of a first value (107) and a second value (125) in the event the sign of the determined ratio is positive, and incrementing that previous reference by a difference between the first value and the second value in the event the sign of the determined ratio is negative.

10. In the control of a vehicle anti-lock braking system, the method of searching for a maximum value of a measure of braking effectiveness comprising the steps of:

determining (125) the side of the peak of a braking effectiveness curve on which the vehicle is currently operating if the vehicle is not operating at the peak of the braking effectiveness curve; and providing an indication of the determined side: and utilizing (117) the determined side indication to modify appropriately the operation of the braking system by incrementing the measure of braking effectiveness in a direction toward the peak.

11. The method of claim 10 in which the measure of braking effectiveness is the product of wheel speed and a measure of braking torque.

12. The method of claim 10 in which the measure of braking effectiveness is the product of wheel speed and a measure of braking torque divided by vehicle velocity.

* * * * *